United States Patent [19]

Nerger

[11] Patent Number: 4,952,117

[45] Date of Patent: Aug. 28, 1990

[54] APPARATUS FOR BALANCING OF POSITIONAL TOLERANCES

[75] Inventor: Klaus K. Nerger, Witten, Fed. Rep. of Germany

[73] Assignee: Mannesmann Aktiengesellschaft, Düsseldorf, Fed. Rep. of Germany

[21] Appl. No.: 327,254

[22] Filed: Mar. 22, 1989

[30] Foreign Application Priority Data

Mar. 22, 1988 [DE] Fed. Rep. of Germany ....... 3810045
Jun. 23, 1988 [DE] Fed. Rep. of Germany ....... 3821548

[51] Int. Cl.$^5$ .............................................. B25J 9/00
[52] U.S. Cl. ...................................... 414/732; 901/45; 901/49
[58] Field of Search ..................... 901/45, 49; 414/729, 414/730

[56] References Cited

U.S. PATENT DOCUMENTS

| 4,316,329 | 2/1982 | Watson | 901/45 X |
| 4,400,885 | 8/1983 | Consales | 901/45 X |
| 4,540,331 | 9/1985 | Stanner et al. | 901/49 X |
| 4,702,667 | 10/1987 | Hounsfield et al. | 901/49 X |

FOREIGN PATENT DOCUMENTS 3004014 8/1981 Fed. Rep. of Germany.
1331639 8/1987 U.S.S.R. ........................ 901/49 X Primary Examiner—Robert J. Spar
Assistant Examiner—James T. Eller, Jr.
Attorney, Agent, or Firm—Horst M. Kasper

[57] ABSTRACT

A device for balancing of positional and spatial tolerances, for example, for a gripper of an industrial robot at the end of the work arm of the indistrial robot, is furnished, where plates are held at a distance (h) for an intermediately disposed movable plate (4a). The movable plate (4a), provided with an attachment for a flange (6) of a gripper, or the like, protrudes with lateral play of motion through an opening of a fixed plate (2b), disposed toward the gripper, whereby the movable plate (4a) is guided via conical centerings in a fixed-point position. In order to be able to balance even larger positional deviations in a horizontal plane with a very small expenditure of force, it is disclosed that a pressure-medium bellows cylinder (7), connected to a pressure-medium system, is disposed between the movable plate (4a) and a centering element support (8), disposed remote from the gripper.

17 Claims, 3 Drawing Sheets

APPARATUS FOR BALANCING OF POSITIONAL TOLERANCES

BACKGROUND OF THE INVENTION

1. Field of the Invention

The invention relates to a device for the balancing of positional and spatial tolerances.

2. Brief Description of the Background of the Invention Including Prior Art

Such a device has been taught in the German Patent Application Laid Open DE-OS No. 3,004,014 and is furnished for industrial robots or similar manipulating apparatus. The lateral deflection is limited with this known device and, upon deflection, the force of springs has to be overcome, which springs continually attempt to press the movable part of the device into a zero position.

SUMMARY OF THE INVENTION

1. Purpose of the Invention

It is an object of the invention to form a device of the above recited kind such that, with very small applications of force, there can be balanced even larger deviations of the position in a horizontal plane.

These and other objects and advantages of the present invention will become evident from the description which follows.

2. Brief Description of the Invention

According to the present invention, a pressure-medium bellows cylinder is disposed between a movable plate and the centering-element support, disposed relatively remote from the gripper or the like, which centering element is connected to a pressure-medium system. The restoring or, respectively, the retaining force, required for the centering and the fixation of position, can be switched on or off as desired. This allows the device in addition resting in an elongated deflected state without external force effect.

A device for balancing of spatial and positional tolerances for a gripper comprises a fixed plate attached to an end section of a work arm, disposed at a distance relative to the end section of the work arm, having a tapered centering system, and having an opening disposed toward the flange for attaching the gripper. A movable plate has a tapered centering means and is intermediately disposed between the end section of the work arm and the fixed plate having an opening. The movable plate protrudes with an attachment part for the flange passing through the opening of the fixed plate. The flange is attached to the attachment part of the movable plate. The attachment part is disposed with a lateral play distance relative to the opening of the fixed plate for allowing lateral movement relative to the fixed plate. The movable plate is guided via the tapered centering means of the fixed plate into a fixed-point position. A centering element support is attached to the end section of the work arm and is disposed away from the gripper as seen from the movable plate. A pressure-medium bellows cylinder is connected to a pressure-medium supply system and is disposed between the flange for the gripper and the centering element support for cushioning and moving the movable plate and the flange for the gripper relative to the fixed plate.

The device can support a gripper of an industrial robot. The centering element support can include a connection piece. The pressure-medium bellows cylinder can be attached with one cylinder end at the flange for the gripper, and with a second cylinder end at the connection piece of the centering element support. The pressure medium supply system can include a pressure-medium line. The connection piece can be connected to the pressure-medium line.

The attachment part for the gripper can be formed as a support tube. Said support tube can connect the movable plate to the flange. The pressure-medium bellows cylinder can be disposed substantially within the support tube.

The centering element support can be furnished with a center bore. The pressure medium supply system can include a pressure-medium screw attachment. A connection lug can be attached to the pressure-medium bellows cylinder, which connection lug can reach through the center bore of the centering element support, and which connecting lug can be connected via the pressure-medium screw attachment to the pressure-medium line.

The centering element support can include fitted bores. A pin, furnished with a centering taper and having a bolting attachment, can be attached with its bolting attachment in one of the fitted bores of the centering element support. Said pin can be guided through tapered centering means of the movable plate and through the tapered centering means of the fixed plate allowing a lateral play for relative lateral motion of the movable plate relative to the fixed plate.

The movable plate can be furnished with conical depression with center bores.

The tapered centering means of the fixed plate can be a center bore. The centering taper of the pin for the tapered centering means of the fixed plate, representing a conical expansion of the fixed plate, can be disposed on a lug disposed on the pin and following and adjoining to the centering taper of the pin.

The centering taper of the pin can be furnished as a centering cone. The centering cone can be disposed on the lug. A motion-limiting nut can be mounted on the lug, where the motion-limiting nut can be axially movable together with the lug.

Ball rollers can be disposed between the fixed plate and the movable plate for supporting the movable plate on the fixed plate.

A pin, furnished with a centering taper and having a bolting attachment, can be attached with its bolting attachment in one of the fitted bores of the centering element support. The attachment means of the movable plate can be a support tube. The fixed plate can include a center bore. An air gap of the width of a shifting distance x can be provided between the support tube and the center bore of the fixed plate as well as between a tapered centering means of the fixed plate and the pin.

The fixed plate can include an annular casing. The distance between the centering element support and the annular casing of the fixed plate can be larger than the shifting distance x.

Ball rollers can be disposed between the fixed plate and the movable plate. The fixed plate can include a center bore. The distance between the ball rollers and the center bore of the fixed plate can be larger than a shifting distance x. The fixed plate can include an annular casing and screws for attaching the annular casing to the end section of the work arm.

The fixed plate, the movable plate, and the centering element support can each represent a part of relative motion. A proximity switch can be attached to a side of one of the parts of relative motion and directed to a second one of the parts of relative motion. The side can be directed toward the second one of the parts of relative motion.

The method for balancing of spatial and positional tolerances for a robot system includes the following steps. The fixed plate is placed into an operational position. A pressure differential is generated with a lower pressure in the pressure-medium supply system and a higher pressure in the pressure-medium bellows cylinder for contracting the pressure-medium bellows cylinder. The movable plate is shifted under small force expenditure in a direction having a component parallel to the fixed plate and reducing the distance between the movable plate and the centering element support.

A gripping process can be performed in that pressure can be applied to drive pressure medium into the pressure-medium bellows cylinder. The position of the movable plate is centered again and fixed again.

A gripping process can be performed in that a stop is contacted with the gripper thereby generating a higher pressure in the pressure-medium bellows cylinder relative to the pressure-medium supply system. The position of the gripper and of the movable plate can be changed. The change in position of the movable plate can be sensed with a proximity switch. A relative position of the movable plate versus the fixed plate can be determined based on the signal from the proximity switch. Pressure can be applied to drive pressure medium into the pressure-medium bellows cylinder. The position of the movable plate can be centered again and fixed again.

The movable plate can pass into any desired position with very small expenditures of force upon emptying or, respectively, partial evacuation of the pressure-medium bellows cylinder. The desired position is limited only by the predetermined lateral play of the motion. This play can amount to, for example, 12 mm, and thus balances a large part of all possible differences, which can be generated by imprecise transfer or, respectively, imprecise positioning of tool pieces on pallets. After gripping of the tool piece, pressure medium is fed to the pressure-medium bellows cylinder upon lifting off of the tool piece gripped by the gripper, and the movable plate is moved via the conical centering means into an exactly predetermined position, such that the following transfer of the tool piece, for example, to the chuck of a processing machine, occurs with the required precision.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
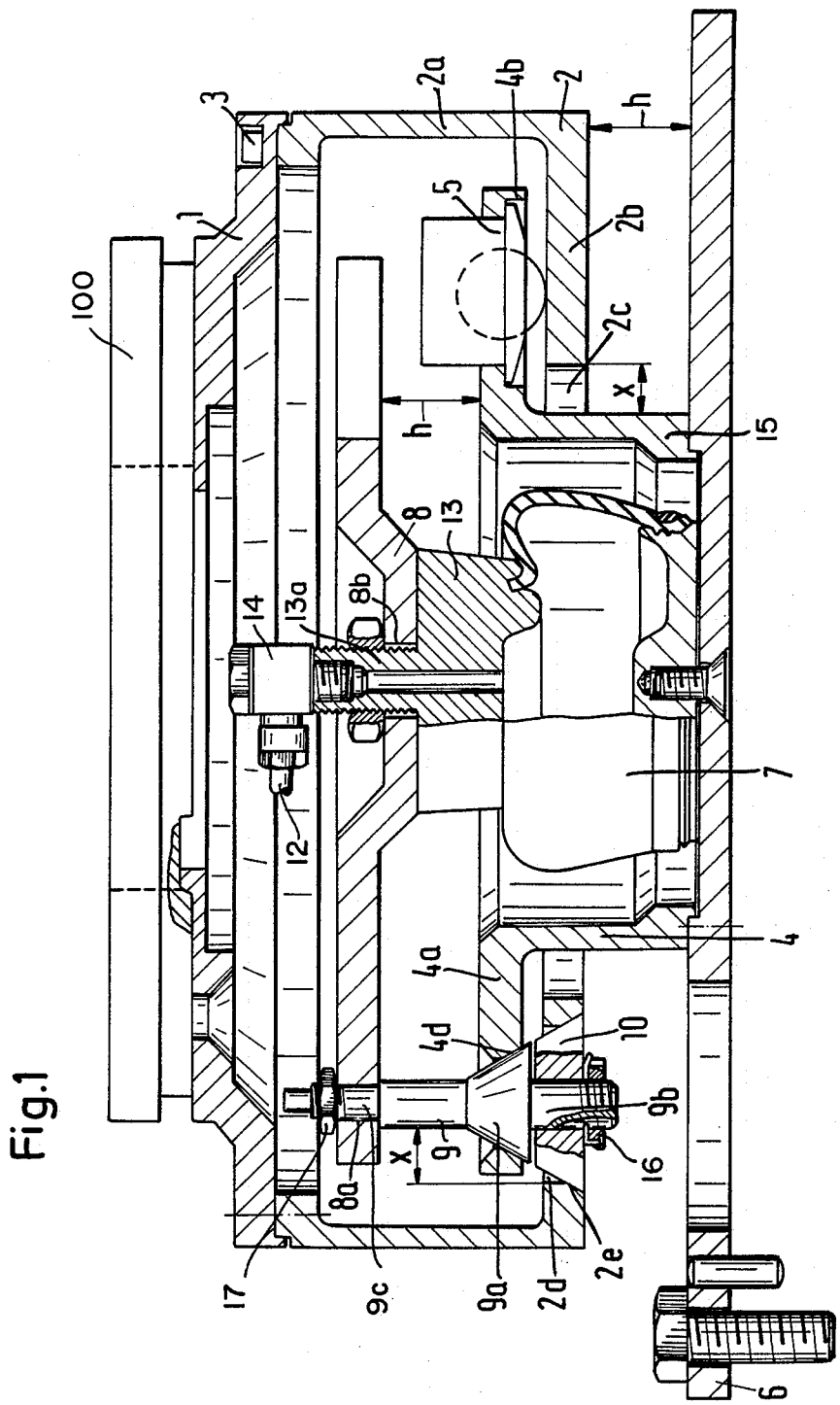
FIG. 1 shows a front elevational view, sectioned in part along section line I—I of FIG. 2.

In accordance with the present invention, there is provided a device for balancing of spatial and positional tolerances, for example for a gripper of an industrial robot, disposed at a robot arm end plate 1, with plates held at a distance to each other for an intermediately disposed movable plate 4a. Said movable plate protrudes with an attachment support tube 4 for a flange 6 of the gripper or the like with a lateral play for movement through an opening of a fixed plate 2b, disposed toward a gripper. The movable plate 4a is guided via conical centering means in the fixed-point position. A pressure-medium bellows cylinder 7, connected to a pressure-medium supply system, is disposed between the movable plate 4a and the centering element support 8. Said centering element support 8 is disposed away from the gripper as seen from the movable plate 4a.

The pressure-medium bellows cylinder 7 can be attached with one cylinder end at a flange 6 for the gripper or the like and with a second cylinder end at a connection piece 13 connected to the centering element support 8. At said connection piece 13 there can be connected a pressure-medium line 12 running to the pressure-medium supply system. The pressure-medium bellows cylinder 7 can be disposed in a support tube 4 of the movable plate 4a. Said support tube can connect the movable plate 4a to the flange 6. A connection lug 13a of the pressure-medium bellows cylinder 7 can reach through a center bore 8b of the centering element support 8 and can be connected via a pressure-medium screw connection 14 to the pressure-medium line 12.

Several pins 9 can be attached in the fitted bores 8a of the centering element support 8 with their bolting attachment means 9c. Said pins 9 can be guided through the movable plate 4a and the fixed plate 2b with a lateral play for motion and said pins 9 can be furnished with conical expansions 9a or, respectively, centering cones 10. The movable plate 4a can be furnished with conical depressions 4d with centering bores 4c. The centering cone 10, for a centering bore 2d with a conical expansion 2e of the fixed plate 2b, can be disposed on a lug 9b following and adjoining to a conical expansion 9a of the pin 9. The centering cone 10 can be disposed on the lug 9b, can be furnished with a motion limiting nut 16, and can be axially movable together with the lug 9b.

The movable plate 4a can be supported via ball rollers 5 on the fixed plate 2b. In each case, an air gap of the width of the shifting distance x can be provided between the support tube 4 of the movable plate 4a and the therefor provided center bore 2c of the fixed plate 2b, as well as between the centering bores 2d of the fixed plate 2b and the pins 9. The distance between the centering element support 8 and the annular casing 2a of the fixed plate 2b can be larger than the shifting distance x. The distance between the ball rollers 5 and the central center bore 2c can be larger than the shifting distance x. The annular casing 2a of the support ring 2 can be attached with screws or bolts 3 to an end plate 1 of a robot arm. The fixed plate 2b, the movable plate 4a, and the centering element support 8 can each represent a part of relative motion. A proximity switch 11, directed to neighboring parts, can be disposed on a side of a part of relative motion, where the side can be directed toward a second part of relative motion.

A support ring 2, formed as an angle profile, is attached at the end of a robot arm 100 with six screws or bolts 3 at a robot-arm end plate 1, as seen in FIG. 1. One arm of this support ring forms an annular casing 2a, the second arm is formed as a fixed plate 2b with a center bore 2c, which center bore 2c is larger by two times a maximum displacement path x as compared to the penetrating support tube 4. The penetrating support tube 4 extends into the movable plate 4a. Furthermore, the fixed plate 2b is furnished with four centering bores 2d, where the position of the centering bores 2d can be recognized in FIG. 2. The diameter of the centering bores 2d is also by two times the distance measure x larger than the diameter of the pins 9 serving for the centering. The centering bores 2d are furnished with conical expansions 2e for the truncated centering cones 10, which are displaceably attached with nuts 16 on lugs 9b of the pins 9. The imaginary cone tip of the truncated centering cone 10 is directed toward the robot arm end plate 1. The cone angle can amount to from about 40 to 70 degrees and preferably to about 60 degrees. The length of the truncated centering cone can correspond to the depth of the bore. In addition, a bore with a ball-shaped, spherical, a rotation-elliptical, a parabolic, cosinusoidal, or a trochoidal profile is conceivable instead of the conical expansion 2e.

The movable plate 4a is furnished with stepped bores 4b for ball rollers 5, disposed on a predetermined and predefined subdividing circle. The movable plate 4a comprises further four centering bores 4c, where the position of the centering bores 4c coincides precisely with the centering bores 2d of the fixed plate 2b. The centering bores 4c are smaller than the centering bore 2d of the fixed plate, as corresponding to the cone taper. The centering bores 4c are furnished with conical depressions 4d for the conical expansions 9a of the pins 9, where the pins 9, with attachment means 9c, are protruding into fitted bores 8a of the centering element support 8, and are tensioned with nuts 17.

The movable plate 4a is disposed above the fixed plate 2b, and the movable plate 4a rests on the fixed plate 2b with ball rollers 5. These ball rollers determine the distance between the movable plate 4a and the fixed plate 2b via the stepped bores 4b of the movable plate 4a.

A flange 6, for the receiving of a gripper or tool, is mounted at the lower end of the support tube 4 in a centered way and secured against rotation. A distance h is maintained between the flange 6 and the fixed plate 2b. A pressure-medium bellows cylinder 7 is attached on the flange 6 with screws 15. The upper end of the pressure-medium bellows cylinder 7 is connected with a connection piece 13 disposed below the centering element support 8. This connection piece 13 is furnished with a connection lug 13a, passing through a center bore 8b, and a pressure-medium bore 13b, which is led through a pressure-medium screw connection 14 to a pressure-medium line 12 and thus is connected to a pressure-medium supply system, not illustrated.

Figure 2:
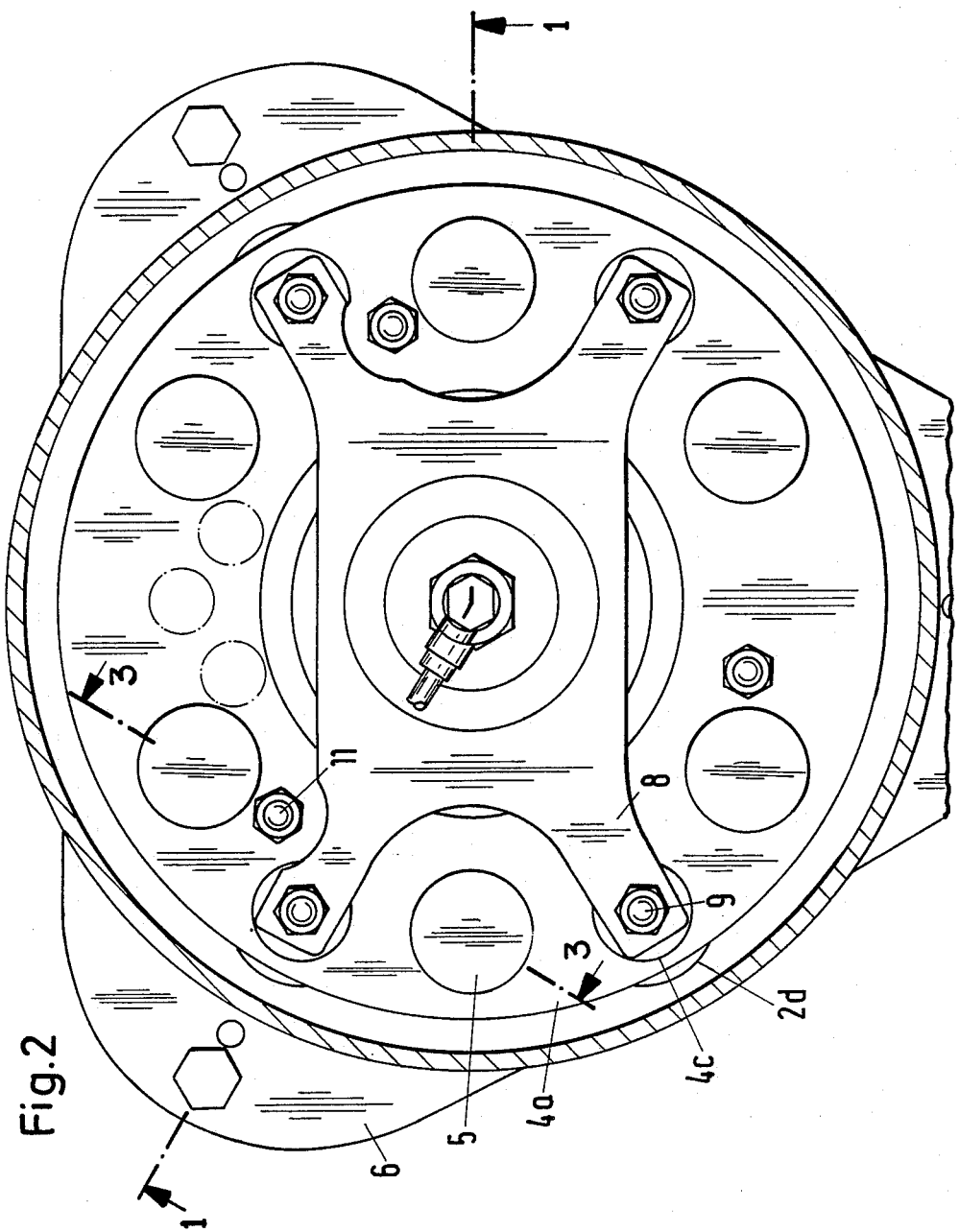
FIG. 2 shows a top plan view onto the embodiment of FIG. 1.

It can be recognized from FIG. 2 that the centering element support 8 is supported only by the bellows cylinder 7 and that four arms of the centering element support 8 cover the centering bores 4c and 2d of the movable plate 4a and of the fixed plate 2b. The already recited distance h remains, in this case, between the centering element support 8 and the movable plate 4a. One of the already recited pins 9 is received at each arm of the centering element support 8 in its fitted bore 8a, which pins 9 pass through the recited centering bores 4c and 2d of the movable plate 4a and of the fixed plate 2b.

The truncated centering cone 10, disposed on the lug 9b of the pin 9, is adjusted with the nut 16 such that, upon the applying of pressure onto the bellows cylinder, simultaneously, the conical expansion 9a of the pin 9 rests in the centering bore 4c of the movable plate 4a, and the centering cone 10 rests in the centering bore 2d of the fixed plate 2b. In order to allow a precise centering and fixing of the movable plate 4a relative to the fixed plate 2b, at least two of these centering elements, i.e. conical expansion 9a and centering cone 10, have to be present.

Figure 3:
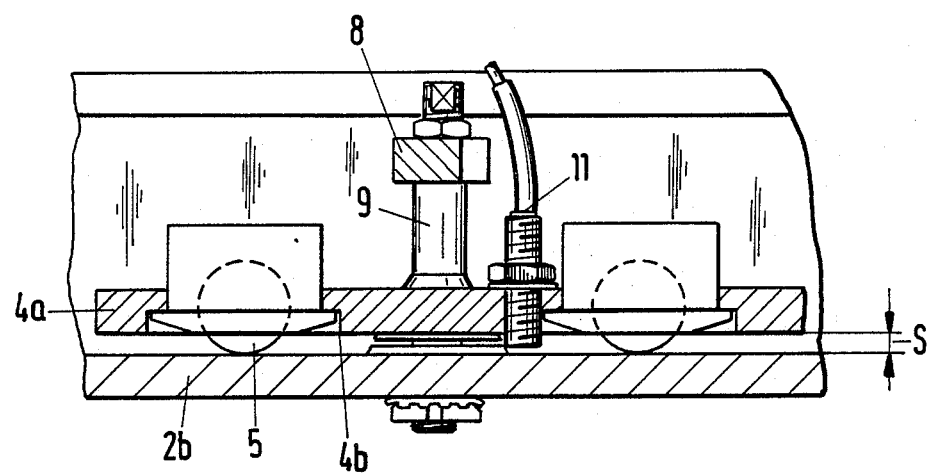
FIG. 3 shows a sectional view along a section line III—III shown in FIG. 2 of the device.

The device includes, for the positional control in the movable plate 4a, three proximity switches 11 directed to the fixed plate 2b, which are illustrated in FIGS. 2 and 3. The proximity switches 11 are disposed precisely on the connection line between two neighboring ball rollers 5. The distance of the proximity switches 11 from the fixed plate 2b is smaller than the switching distance. If now, caused by an external force effect onto the movable plate 4a, the distance s between the movable plate 4a and the fixed plate 2b is increased, then this is signalized by one or several proximity switches 11. According to a further embodiment of the device, the proximity switches 11 can also be positioned on smaller or, respectively, larger subdividing circles of the movable plate. If, for example, the subdividing circle is selected so small that it approaches the edge of the central center bore of the fixed plate 2b, then also small lateral deflections can be captured.

The fixed plate can be attached with an outer annular casing 2a to the end of the robot arm 100. A center bore 2c is disposed in the center of the fixed plate 2b of the support ring 2. The length in axial direction of the annular casing 2a can be from about 0.5 to 2 times the radial width of the fixed plate 2b. The length of the tube attachment of the movable plate can be from about 0.5 to 1 times the axial length of the annular casing 2a. The rest contact position of the ball rollers can have a radial distance from the axis of the device which corresponds to from about 0.8 to 1 times the radial distance of the tapered centering means for the center of the device.

The length of the attachment means of the movable plate 4a can be from about 1 to 3 times the available distance for travel of the movable plate. The dimension of the conical expansion 9a of the pin 9, in a direction parallel to the axis of the device or parallel to the axis of the pin, can be from about 0.4 to 0.7 of the travel path length of the movable plate 4a relative to the fixed plate 2b. The height of the pressure-medium bellows cylinder can be from about 0.6 to 1 times the length of the attachment support tube 4 of the movable plate 4a. The flange can be attached with a central screw to a neighboring part of the pressure-medium bellows cylinder. The movable plate can be welded or screwed with its attachment support tube 4 to the flange 6. The diameter of the ball rollers can be from about 0.7 to 1 times the travel path length of the movable plate 4a relative to the fixed plate 2b. The diameter of the connection piece 13 for the pressure-medium bellows can be from about 1.5 to 3 times the travel path length of the movable plate 4a relative to the fixed plate 2b. The diameter of the centering element support can be from about 0.8 to 1.2 times the diameter of the movable plate. The flange is preferably provided with openings for access to the pins 9 and for allowing the pins 9 a full travel length relative to the movable plate 4a. The bolts 3 are preferably positioned near the outer circumference of the end plate 1 of the robot work arm. The support ring 2 is preferably reinforced in the area of the engagement of the bolts 3 for heavy duty applications.

Proximity switches can be disposed at the side of the centering element support 8 facing the movable plate 4a and, alternatively, at the fixed plate facing the movable plate. Alternatively, proximity switches can be disposed at the movable plate on either side where the movable plate faces a fixed position element.

The ball rollers can be substituted by other antifriction elements such as cylindrical, conical or otherwise shaped rollers.

The operational position of the fixed plate 2b is horizontal. In this position, the movable plate 4a, with the gripper tool mounted on the flange 6, can be shifted in a plane with very small force expenditure in a direction parallel to the fixed plate 2b toward each side by 12 mm, corresponding to the movement slot x. For this purpose, an under-pressure has to be generated in the pressure-medium bellows cylinder 7, such that this bellows cylinder 7 contracts completely. Thereby, the distance h between the movable plate 4a and the centering element support 8 is reduced to a zero distance, where also the pins 9 are shifted downwardly toward the flange 6. Then, the diameter of the pin 9 is disposed above the conical expansion 9a at the level of the centering bore 2d of the fixed plate 2b. Thereby, a corresponding movement slot x is also generated between the centering bore 2d and the pin 9. Thus, the movable plate 4a can be shifted in the area of the movement slot x via the ball rollers 5 versus the fixed plate 2b. After termination of the gripping process, the device has to be centered again and fixed again by pressure application to the pressure-medium bellows cylinder 7.

A further mode of operation of this device comprises the recognition of collision even in a fixed state. If the gripping tool, mounted to the flange 6, encounters a perpendicular obstacle or stop, then the flange 6 is lifted with the support tube 4 against the opposing pressure in the pressure-medium bellows cylinder 7. The distance s thereby increases at the most by the amount h, i.e., in case of the embodiment illustrated, by 25 mm. This positional change is recognized by the proximity switch 11. In addition, a collision of the gripper tool in a horizontal direction is recognized by way of the thereby occurring inclined position of the support pipe, where only a part of the ball rollers 5 and the proximity switch 11 are lifted off from the fixed plate 2b.

It will be understood that each of the elements described above, or two or more together, may also find a useful application in other types positional-tolerance balancing apparatus differing from the types described above.

While the invention has been illustrated and described as embodied in the context of a device for the balancing of positional and spatial tolerances, for example for a gripper of an industrial robot, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for balancing of spatial and positional tolerances for a gripper comprising
    an end section of a work arm;
    a flange for attaching a gripper;
    a fixed plate attached to the end section of the work arm, disposed at a distance relative to the end section of the work arm, having a tapered centering means, and having an opening disposed toward the flange for attaching the gripper;
    a movable plate having a tapered centering means and intermediately disposed between the end section of the work arm and the fixed plate having an opening, wherein the movable plate protudes with an attachment part for the flange passing through the opening of the fixed plate, wherein the flange is attached to the attachment part of the movable plate, wherein the attachment part is disposed with a lateral play distance relative to the opening of the fixed plate for allowing lateral movement relative to the fixed plate, and wherein the movable plate is guided via the tapered centering means of the fixed plate into a fixed-point position;
    a centering element support retained by the end section of the work arm and disposed away from the gripper as seen from the movable plate;
    a pressure medium supply system;
    a pressure-medium bellows cylinder connected to the pressure-medium supply system and disposed between the flange for the gripper and the centering element support for cushioning and moving the movable plate and the flange for the gripper relative to the fixed plate;
    a pin furnished with a centering taper and having a bolting attachment and attached with its bolting attachment in one of the fitted bores of the centering element support, wherein said pin is guided through tapered centering means of the movable plate and through the tapered centering means of the fixed plate allowing a lateral play for relative lateral motion of the movable plate relative to the fixed plate.

2. The device according to claim 1, wherein the centering element support includes fitted bores.

3. The device according to claim 1, wherein
    the movable plate is furnished with conical depressions with center bores.

4. The device according to claim 1, wherein the tapered centering means of the fixed plate is a center bore;
    wherein the centering taper of the pin for the tapered centering means of the fixed plate, representing a conical expansion of the fixed plate, is disposed on a lug disposed on the pin and following and adjoining to the centering taper of the pin.

5. The device according to claim 4, wherein the centering taper of the pin is furnished as a centering cone;
    wherein the centering cone is disposed on the lug; and further comprising
    a motion-limiting nut mounted on the lug, wherein the motion-limiting nut is axially movable together with the lug.

6. The device according to claim 1, further comprising
    ball rollers disposed between the fixed plate and the movable plate for supporting the movable plate on the fixed plate.

7. The device according to claim 1 further comprising
ball rollers disposed between the fixed plate and the movable plate;
wherein the fixed plate includes a center bore;
wherein the distance between the ball rollers and the center bore of the fixed plate is larger than a shifting distance (x) of the movable plate.

8. The device according to claim 1,
wherein the fixed plate includes an annular casing; further comprising
screws for attaching the annular casing to the end section of the work arm.

9. The device according to claim 1, wherein the fixed plate, the movable plate, and the centering element support represent each a part of relative further comprising a proximity switch attached to a side of one of the parts of relative motion and directed to a second one of the parts of relative motion, and wherein the side is directed toward the second one of the parts of relative motion.

10. A device for balancing of spatial and positional tolerances for a gripper comprising
an end section of a work arm;
a flange for attaching a gripper;
a fixed plate attached to the end section of the work arm, disposed at a distance relative to the end section of the work arm, having a tapered centering means, and having an opening disposed toward the flange for attaching the gripper;
a movable plate having a tapered centering means and intermediately disposed between the end section of the work arm and the fixed plate having an opening, wherein the movable plate protrudes with an attachment part for the flange passing through the opening of the fixed plate, wherein the flange is attached to the attachment part of the movable plate, wherein the attachment part is disposed with a lateral play distance relative to the opening of the fixed plate for allowing lateral movement relative to the fixed plate, and wherein the movable plate is guided via the tapered centering means of the fixed plate in to a fixed-point position;
a centering element support retained by the end section of the work arm and disposed away from the gripper as seen from the movable plate;
a pressure medium supply system;
a pressure-medium bellows cylinder connected to the pressure-medium supply system and disposed between the flange for the gripper and the centering element support for cushioning and moving the movable plate and the flange for the gripper relative to the fixed plate;
wherein the centering element support includes a connection piece;
wherein the pressure-medium bellows cylinder is attached with one cylinder end at the flange for the gripper, and with a second cylinder end at the connection piece of the centering element support;
wherein the pressure medium supply system includes a pressure-medium line; and wherein a connection piece is connected to the pressure-medium line.

11. The device according to claim 10,
wherein the attachment part for the gripper is formed as a support tube, which support tube connects the movable plate to the flange; and
wherein the pressure-medium bellows cylinder is disposed substantially within the support tube.

12. The device according to claim 10,
wherein the centering element support is furnished with a center bore;
wherein the pressure medium supply system includes a pressure-medium screw attachment, and further comprising a connection lug attached to the pressure-medium bellows cylinder, which connection lug reaches through the center bore of the centering element support and which connecting lug is connected via the pressure-medium screw attachment to the pressure-medium line.

13. A device for balancing of spatial and positional tolerances for a gripper comprising
an end section of a work arm;
a flange for attaching a gripper;
a fixed plate attached to the end section of the work arm, disposed at a distance relative to the end section of the work arm, having a tapered centering means, and having an opening disposed toward the flange for attaching the gripper;
a movable plate having a tapered centering means and intermediately disposed between the end section of the work arm and the fixed plate having an opening, wherein the movable plate protrudes with an attachment part for the flange passing through the opening of the fixed plate, wherein the flange is attached to the attachment part of the movable plate, wherein the attachment part is disposed with a lateral play distance relative to the opening of the fixed plate for allowing lateral movement relative to the fixed plate, and wherein the movable plate is guided via the tapered centering means of the fixed plate into a fixed-point position;
a centering element support retained by the end section of the work arm and disposed away from the gripper as seen from the movable plate;
a pressure medium supply system;
a pressure-medium bellows cylinder connected to the pressure-medium supply system and disposed between the flange for the gripper and the centering element support for cushioning and moving the movable plate and the flange for the gripper relative to the fixed plate;
a pin furnished with a centering taper and having a bolting attachment and attached with its bolting attachment in one of the fitted bores of the centering element support;
wherein the attachment means of the movable plate is a support tube;
wherein the fixed plate includes a center bore;
wherein an air gap of the width of a shifting distance (x) of the movable plate is provided between the support tube and the center bore of the fixed plate as well as between a tapered centering means of the fixed plate and the pin.

14. The device according to claim 13, wherein the fixed plate includes an annular casing; wherein the distance between the centering element support and the annular casing of the fixed plate is larger than the shifting distance (x) of the movable plate.

15. A method for balancing of spatial and positional tolerances for a robot system including the following elements:
an end section of a work arm;
a flange for attaching a gripper;
a fixed plate attached to the end section of the work arm, disposed at a distance relative to the end section of the work arm, having a tapered centering means, and having an opening disposed toward the flange for attaching the gripper;

a movable plate having a tapered centering means and intermediately disposed between the end section of the work arm and the fixed plate having an opening, wherein the movable plate protrudes with an attachment part for the flange passing through the opening of the fixed plate, wherein the flange is attached to the attachment part of the movable plate, wherein the attachment part is disposed with a lateral distance relative to the opening of the fixed plate for allowing lateral movement relative to the fixed plate and wherein the movable plate is guided via the tapered centering means of the fixed plate into a fixed-point position;

a centering element support attached to the end section of the work arm and disposed away from the gripper as seen from the movable plate;

a pin furnished with a centering taper and having a bolting attachment and attached with its bolting attachment in one of the fitted bores of the centering element support; a pressure medium supply system;

a pressure-medium bellows cylinder connected to the pressure-medium supply system and disposed between the flange for the gripper and the centering element support for cushioning and moving the movable plate and the flange for the gripper relative to the fixed plate;

comprising the following steps:

placing the fixed plate into an operational position;

generating a pressure differential with a lower pressure in the pressure-medium supply system and a higher pressure in the pressure-medium bellows cylinder for contracting the pressure-medium bellows cylinder;

shifting the movable plate under small force expenditure in a direction having a component parallel to the fixed plate and reducing the distance between the movable plate and the centering element support;

guiding said pin through tapered centering means of the movable plate and through the tapered centering means of the fixed plate;

allowing a lateral play of the pin for a relative lateral motion of the movable plate relative to the fixed plate.

16. The method for balancing of spatial and positional tolerances according to claim 15 further comprising performing a gripping process;

applying pressure to drive pressure medium into the pressure-medium bellows cylinder;

centering again and fixing again the position of the movable plate.

17. The method for balancing of spatial and positional tolerances according to claim 15 further comprising performing a gripping process;

contacting a stop with the gripper thereby generating a higher pressure in the pressure-medium bellows cylinder relative to the pressure-medium supply system;

changing the position of the gripper and of the movable plate;

sensing the change in position of the movable plate with a proximity switch;

determining a relative position of the movable plate versus the fixed plate based on the signal from the proximity switch;

applying pressure to drive pressure medium into the pressure-medium bellows cylinder;

centering again and fixing again the position of the movable plate,

* * * * *